(12) United States Patent
Chowdhury et al.

(10) Patent No.: US 11,055,491 B2
(45) Date of Patent: Jul. 6, 2021

(54) GEOGRAPHIC LOCATION SPECIFIC MODELS FOR INFORMATION EXTRACTION AND KNOWLEDGE DISCOVERY

(71) Applicant: INTERNATIONAL BUSINESS MACHINES CORPORATION, Armonk, NY (US)

(72) Inventors: Md Faisal Mahbub Chowdhury, Woodside, NY (US); Michael Robert Glass, Bayonne, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 16/268,044

(22) Filed: Feb. 5, 2019

(65) Prior Publication Data
US 2020/0250275 A1    Aug. 6, 2020

(51) Int. Cl.
*G06F 40/30*    (2020.01)
*H04L 29/08*    (2006.01)

(52) U.S. Cl.
CPC .............. *G06F 40/30* (2020.01); *H04L 67/10* (2013.01)

(58) Field of Classification Search
CPC .................................. G06F 40/30; H04L 67/10
See application file for complete search history.

(56) References Cited

U.S. PATENT DOCUMENTS

| | | | |
|---|---|---|---|
| 5,905,773 | A | 5/1999 | Wong et al. |
| 6,385,312 | B1 | 5/2002 | Shaffer et al. |
| 7,328,155 | B2 | 2/2008 | Endo et al. |
| 8,078,467 | B2 | 12/2011 | Wu et al. |
| 8,255,217 | B2 | 8/2012 | Stent et al. |
| 10,423,688 | B1 * | 9/2019 | Patton ................. G06F 16/9537 |
| 2002/0072917 | A1 | 6/2002 | Irvin et al. |
| 2009/0030697 | A1 | 1/2009 | Cerra et al. |

(Continued)

OTHER PUBLICATIONS

Daniel Gildea, "Corpus Variation and Parser Performance," Proceedings of the 2001 Conference on Empirical Methods in Natural Language Processing. Jun. 3-4, 2001. 6 pages.

(Continued)

*Primary Examiner* — Sonia L Gay
(74) *Attorney, Agent, or Firm* — Cantor Colburn LLP; Anthony Curro

(57) ABSTRACT

Computer-implemented methods, computer systems and computer program products for providing geographic location specific models for information extraction and knowledge discovery are provided. Aspects include receiving a body of input text using a processor having natural language processing functionality. Aspects also include using information extraction functionality of the processor to extract preliminary information including a relational table from the body of input text. Aspects also include determining one or more geographical contexts associated with the input text based on the preliminary information. Aspects also include determining inferred information based on the preliminary information and the one or more geographical contexts associated with the input text. Aspect also include augmenting the relational table with the inferred information.

16 Claims, 10 Drawing Sheets

(56) References Cited

U.S. PATENT DOCUMENTS

2015/0110433 A1* 4/2015 Borchardt ............ F16C 35/042
384/489

OTHER PUBLICATIONS

Lane, et al., "Language model switching based on topic detection for dialog speech recognition," IEEE International Conference on Acoustics, Speech, and Signal Processing (ICASSP'03). Apr. 6-10, 2003. 4 pages.

Nishimuta et al. "A robot quizmaster that can localize, separate, and recognize simultaneous utterances for a fastest-voice-first quiz game." Humanoid Robots (Humanoids), 2014 14th IEEE-RAS International Conference on. IEEE, 2014.

Santos-Perez et al., . "Topic-dependent language model switching for embedded automatic speech recognition." Ambient Intelligence-Software and Applications. Springer, Berlin, Heidelberg, 2012. 235-242.

Van Den Mergele, "Design of a Plugin-based Approach for Word-per-Word." Diss, Universiteit Gent (2013-2014).

Vilares et al., "Sentiment Analysis on Monolingual, Multilingual and Code-Switching Twitter Corpora," Proceedings of the 6th Workshop on Computational Approaches to Subjectivity, Sentiment and Social Media Analysis. Sep. 19-21, 2015. 7 pages.

* cited by examiner

502

The famous Festival of Pumpkins is scheduled on October 28, 2017. Mark your calendars now and plan to come to downtown Paris for this community event. It is the Super Bowl of Pumpkin carving artists. Last year's winner was a carving of Sitting Bull. A charity football game will be held in nearby ground in the afternoon. For more information please contact Organizers at 555-555-5555. Air Mexico is the official sponsor this year, having donated 100,000 pesos.

IE System
504

Geographical Detection System
508

| Arg1 | Relation | Arg2 |
|---|---|---|
| Festival of Pumpkins | Location | Paris |
| Festival of Pumpkins | Date | October 28, 2017 |
| Organizers | Phone No | 555-555-5555 |
| Football | Is-a | Sports |
| Super Bowl | Is-a | Event |
| Festival of Pumpkins | Official Sponsor | Air Mexico |
| Air Mexico | Is-a | Airline Company |
| 100,000 | Unit | Pesos |

502: The famous Festival of Pumpkins is scheduled on October 28, 2017. Mark your calendars now and plan to come to downtown Paris for this community event. It is the Super Bowl of Pumpkin carving artists. Last year's winner was a carving of Sitting Bull. A charity football game will be held in nearby ground in the afternoon. For more information please contact Organizers at 555-555-5555. Air Mexico is the official sponsor this year, having donated 100,000 pesos.

IE System 504

Geographical Context (for whole text): USA
Geographical Context for "Air Mexico": Mexico Geographical Detection System 508

| Arg1 | Relation | Arg2 |
|---|---|---|
| Festival of Pumpkins | Location | Paris, USA — 512 |
| Festival of Pumpkins | Date | October 28, 2017 |
| Organizers | Phone No | 555-555-5555 |
| Football | Is-a | American Sports — 514 |
| Super Bowl | Is-a | Sports Event — 516 |
| Festival of Pumpkins | Official Sponsor | Air Mexico — 518 |
| Air Mexico | Is-a | Airline Company |
| 100,000 | Unit | Mexican Pesos |
| Sitting Bull | Is-a | Person — 520 |

GEOGRAPHIC LOCATION SPECIFIC MODELS FOR INFORMATION EXTRACTION AND KNOWLEDGE DISCOVERY

BACKGROUND

The present invention generally relates to programmable computing systems, and more specifically, to computing systems, computer-implemented methods, and computer program products configured to use natural language processing algorithms to provide geographic location specific models for information extraction and knowledge discovery.

Computing systems use natural language processing (NLP) algorithms to process and analyze large amounts of natural language (i.e., human language) data for use in automated interactions between computers and humans. NLP is frequently used for speech recognition, natural language understanding and natural language generation. NLP can be used in various applications, such as spam filtering, automated customer service interactions, summarization of information, question answering, and information extraction. Information extraction is a process that involves automatically extracting structured information from unstructured, semi-structured or structured data. Information extraction is commonly used in NLP to extract structured data from unstructured text. For example, information extraction could be applied to a news article to extract information from the article about an event, the parties involved in the event, the outcome, and the like. The data can be extracted in a structured format (e.g., in a relational table) so that it may be readily used in various automated applications (e.g., a search engine). Thus, the quality of the performance of various applications can be improved by improving the amount and/or quality of data (e.g., the accuracy of relationships between entities) that is extracted or inferred from a source text.

SUMMARY

Embodiments of the present invention are directed to a computer-implemented method for providing geographic location specific models for information extraction and knowledge discovery. A non-limiting example of the computer-implemented method includes receiving a body of input text using a processor having natural language processing functionality. The method also includes using information extraction functionality of the processor to extract preliminary information comprising a relational table from the body of input text using information extraction techniques. The method also includes determining one or more geographical contexts associated with the input text based on the preliminary information. The method also includes determining inferred information based on the preliminary information and the one or more geographical contexts associated with the input text. The method further includes augmenting the relational table with the inferred information.

Embodiments of the present invention are directed to a system for providing geographic location specific models for information extraction and knowledge discovery. The system includes a memory having computer readable computer instructions, and a processor for executing the computer readable instructions. The processor includes a natural language processing functionality. The computer readable instructions include instructions for receiving a body of input text. The computer readable instructions also include instructions for using information extraction functionality of the processor to extract preliminary information comprising a relational table from the body of input text using information extraction techniques. The computer readable instructions also include instructions for determining one or more geographical contexts associated with the input text based on the preliminary information. The computer readable instructions also include instructions for determining inferred information based on the preliminary information and the one or more geographical contexts associated with the input text. The computer readable instructions also include instructions for augmenting the relational table with the inferred information.

Embodiments of the invention are directed to a computer program product for providing geographic location specific models for information extraction and knowledge discovery, the computer program product comprising a computer readable storage medium having program instructions embodied therewith. The program instructions are executable by a processor to cause the processor to perform a method. A non-limiting example of the method includes receiving a body of input text using a processor having natural language processing functionality. The method also includes using information extraction functionality of the processor to extract preliminary information comprising a relational table from the body of input text using information extraction techniques. The method also includes determining one or more geographical contexts associated with the input text based on the preliminary information. The method also includes determining inferred information based on the preliminary information and the one or more geographical contexts associated with the input text. The method further includes augmenting the relational table with the inferred information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5A depicts an example of geographically-based information extraction and knowledge discovery implemented according to one or more embodiments of the present invention.

FIG. 5E depicts an example of geographically-based information extraction and knowledge discovery implemented according to one or more embodiments of the present invention.

Figure 1:
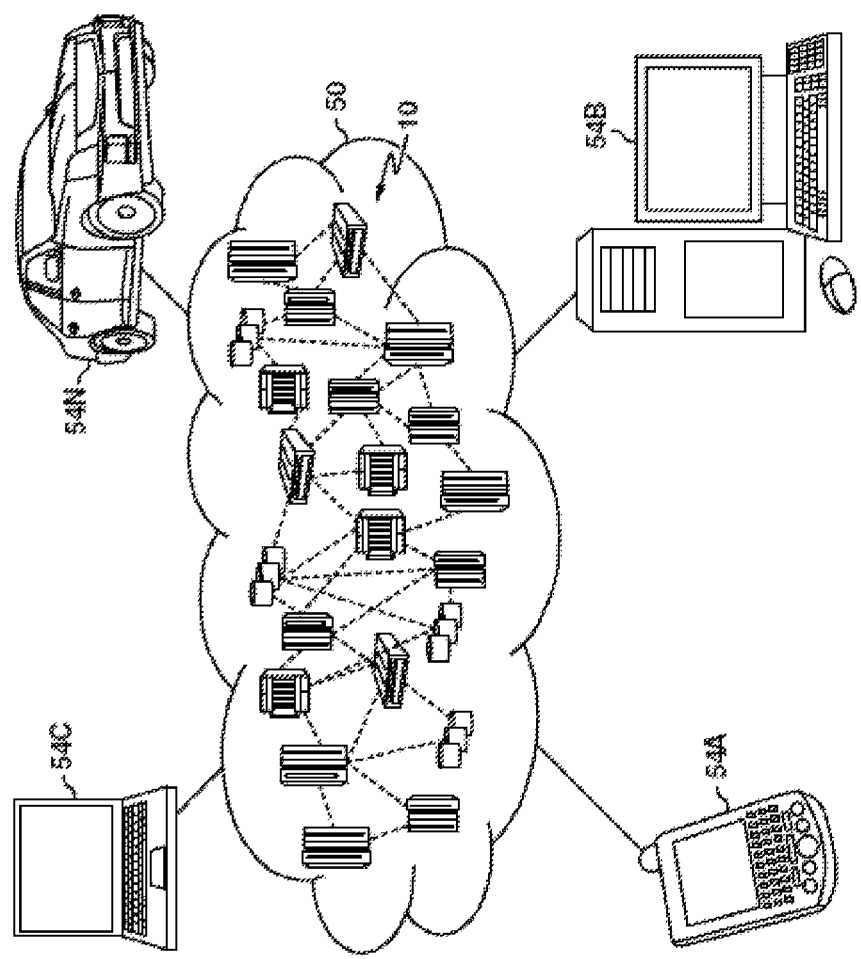
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
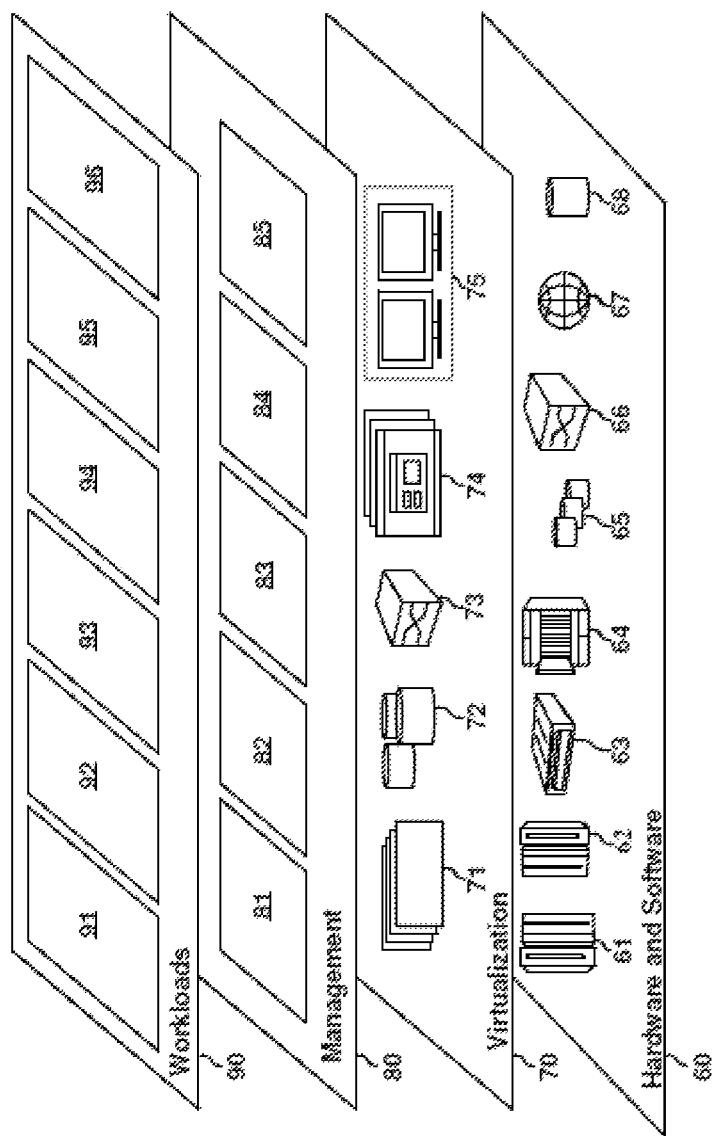
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing geographic location specific models for information extraction and knowledge discovery 96.

Figure 3:
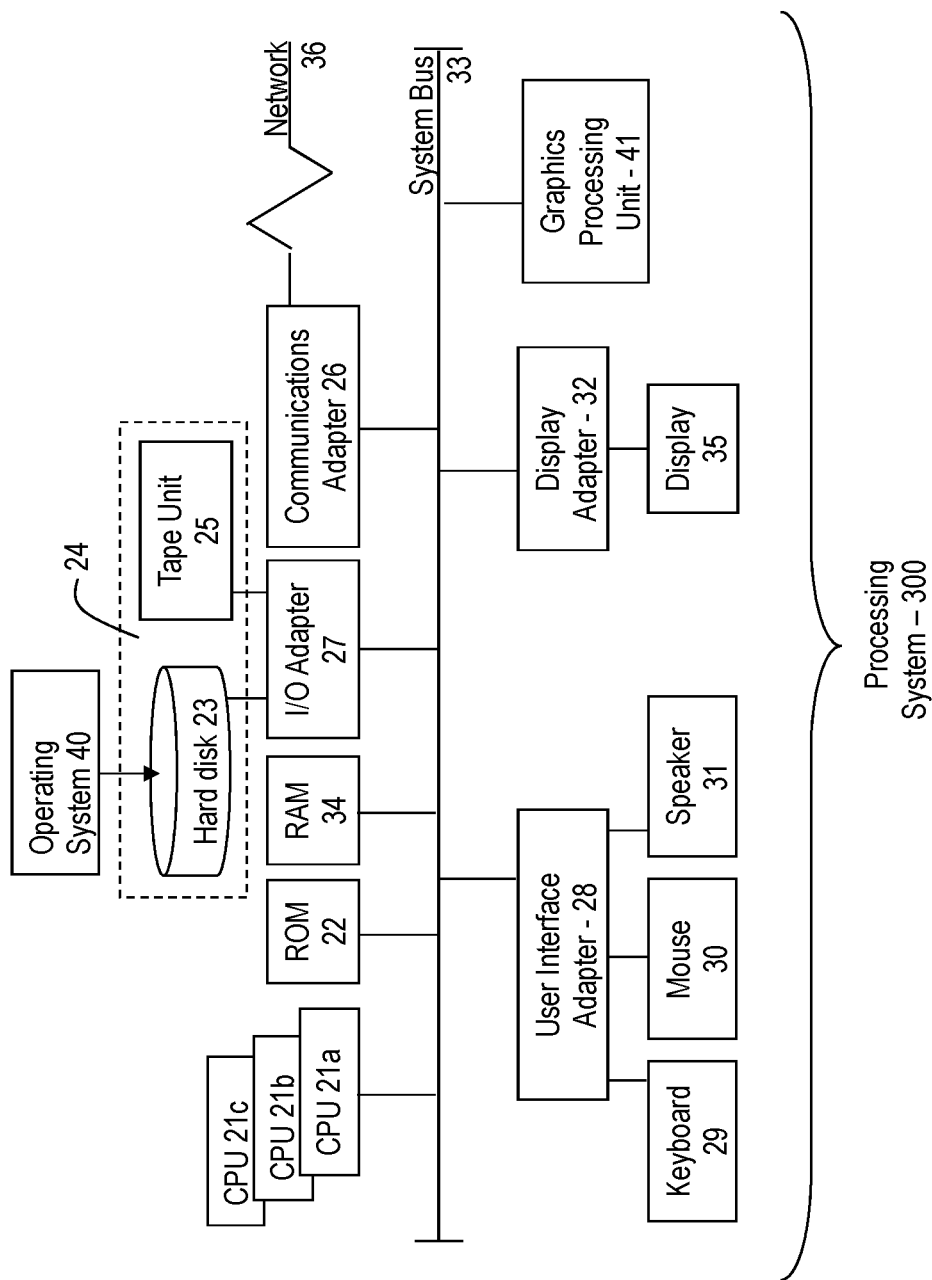
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Information extraction (IE) techniques allow for the automated retrieval of structured data from unstructured text. For example, information extraction techniques allow for the automatic retrieval of data from text documents, databases, websites or many other such sources. As will be appreciated by those of skill in the art, information extraction can utilize named entity recognition techniques, which allow for the recognition of entities as one of several categories such as location, persons, or organizations. Once the named entities are categorized, the named entity's related information can be extracted and a machine-readable document can be constructed that can be processed by various algorithms to extract meaning, such as for example, relationship extraction.

As will be appreciated by those of skill in the art, various information extraction solutions may utilize machine learning techniques. Performance of machine learning based information extraction solutions are generally tied to the size of training data and the discriminative features that can be extracted from that data (i.e., how that data is used for training). Conventional information extraction approaches are generally based either on different machine learning models for different languages (e.g., one model for English, another model for Mandarin, etc.) or on different machine learning models for different domains (e.g., one model for financial news domain and a different model for sports news domain). However, cues of geographic location can be useful for relation discovery. Accordingly, embodiments of the present disclosure provide machine learning based information extraction approaches that may exploit data specific to different locations to train information extraction systems for a common language. For example, embodiments of the present disclosure can be configured to provide a first model for financial news related a first country (e.g., U.S.) and a separate second model for financial news related to a second country (e.g., India). As will be appreciated by those of skill in the art, such models may be natural language processing models that may or may not include a machine learning model. By exploiting the geographic contexts of the data sets, the models can allow applications to provide more meaningful and/or accurate results than conventional models by, for example, selecting a model for use or selectively applying a model based on a determined geographic context of a text.

As will be described in greater detail below, embodiments of the present disclosure contemplate a system that includes an information extraction system for extracting entities/concepts and relations from input text and a geographical detection system for iteratively applying various analyses and algorithms to the extracted data to identify geographic contexts of the data that can then be iteratively used by the information extraction system to discover new information that can be added to the extracted data set. "Entities" may be general or specific people, places or things, whereas "concepts" can be categories or ideas. Both entities and concepts may or may not be arguments to relations. Thus, using the techniques described herein, the system can extract preliminary information (e.g., entities and relations) using information extraction techniques, and then by iteratively determining and utilizing geographic contexts, the system may transform and/or augment the extracted data with additional information that provides a more complete set of data, thereby allowing applications that utilize the extracted data to expand their functionality and provide more complete and/or accurate activities (e.g., a more complete or accurate automated response to a question). Further, although this disclosure is generally directed towards receiving an input text, this disclosure is not so limited, and it is contemplated that some embodiments may receive images, video or sound data that can be converted (e.g., image or voice recognition functions may be performed to identify words in images or recordings) to text for processing by the system.

There are many types of information and specifically entities (e.g., person/organization names) that can be specific to a geographic location. For example, phone number formats are generally based on geographic location and therefore extraction of phone numbers can provide an indication of the region or regions relevant to a document (or a body of text). For example, U.S. and Canadian phone numbers have ten digits (or eleven including the region code (1)) that are typically grouped by punctuation or spaces into a 3, 3, 4 pattern, such as for example: (555) 555-5555. However, other regions or countries may use a different format for phone numbers. For example, in France phone numbers are nine digits (or ten when including the leading zero or eleven if including the region code (33)). The digit pattern for a French phone number is 1, 2, 2, 2, 2, such as for example: 05 55 55 55 55 or simply 5 55 55 55 55. Thus, a geographic context may be inferred from a phone number format.

Similarly, the identification and interpretation of an address can depend on the relevant region. A zip code in the U.S. is seven digits optionally followed by four digits for the "add-on code" grouped as 7 or 7, 4. However, in Japan, a postal code is given as seven digits grouped in a 3, 4 pattern. The other elements of the address are also different. For example, U.S. addresses are structured as street number, street name, city and state, whereas Japanese addresses are instead structured as prefecture, municipality, city district number, block number, building number. Similarly, different regions may use different date formats. For instance, the date format used in the U.S. is MM/DD/YYYY, whereas the date format used in the U.K. is DD/MM/YYYY. Thus, geographical contexts can be inferred from both address and date formats. It should be appreciated that these are merely examples, and there may be many other aspects of data that can provide an indication of a geographic region, such as for example, the use of certain words (e.g., "couch" vs. "settee"), the spelling of words (e.g., "color" vs. "colour") and other such aspects. According to some embodiments of the invention, a system for inferring geographic context may be a deep learning based system, such as a convolutional neural network (CNN) or a recurrent neural network (RNN) applied to a word vector representation of information.

Geographical contexts can be used to infer additional information about various subjects or entities such as currency, entity resolution (e.g., determining that "Paris" refers to "Paris, Texas" and not "Paris, France"), phone number completion, address completion, date completion and other such determinations about characteristics of an entity as may be determinable in relation to a geographical context. For example, geographical context, as used in accordance with embodiments of the invention disclosed herein, can provide an indication of additional information about an amount of currency, such as the country associated with the currency. For instance, if text of a document analyzed by an information extraction system describes an amount of dollars, it may be unclear whether the text refers to U.S. or Canadian dollars, but such information may be inferred by using a model that depends on the salient region(s). As will be appreciated, such insights provide additional useful information that may not have been determined using conventional methods, such as the relative value of a currency amount (e.g., based on the country associated with the currency and currency exchange rates).

Embodiments of the present disclosure may be configured to use semantic web resources together with distributional semantics and other related techniques (e.g., Latent Semantic Analysis (LSA), Latent Dirichlet Allocation (LDA), word embeddings, bag of words in linear model, deep learning based document classification, etc.) to group texts of a well-spoken language (e.g., English) collected by for example, a web-crawler, by geographic locations. The grouped texts may be used to train separate location specific machine learning models to build more accurate information extraction (e.g., named entity recognition) systems. Further, as will be described further herein, embodiments of the present disclosure may determine location cues or other indications of geography relating to preliminary data generated by an information extraction system for knowledge discovery to generate inferred data and information. Embodiments of the present disclosure may take advantage of geographic location specific subtle features by training separate location specific machine learning models. The techniques described herein can work for any language for which enough text data, grouped by relatedness to different geographic locations, can be gathered.

According to some embodiments, prior to training a model, the systems and methods described herein may use semantic web resources such as for example, DBpedia Spotlight, or another entity recognition system that supports location detection and linking to country or region, dictionary match location mentions (cities, rivers, districts) and look up the corresponding country using a geographical database, such as for example, GeoNames. For example, if a document mentions "New York City" explicitly, it can be assumed that this is a relevant geographic location. Then, a model can be trained to predict the general geographic location (determined by the location mentions) from the other text (i.e., non-location mention text). In other words, a model could be trained to use everything except the location mentions to predict the location inferred from the location mentions. This can allow for a location detection model to use indicators of location apart from location mentioned. As will be appreciated, the people and organizations mentioned in a document can be a strong indicator of the relevant location. For example, mention of the baseball team "The Yankees" in a text may be an indicator of a geographic context of "New York" and/or "USA." Thus, according to some embodiments of the invention, a location model can be trained without requiring annotation According to some embodiments, each mentioned location can be a prediction task and the model can predict the country of each mentioned location using the other text, including the other location mentions. According to some embodiments, the resulting model can provide a probability distribution over what country the next mentioned location will be from. This can be viewed as a measure of the document relevance for each country. Thus, as described above, in some embodiments, the location model trained using weakly-supervised or self-supervised training, can be a probabilistic model.

According to some embodiments of the invention, the geographic context of a document can be detected from one or more of the relations extracted from a text using an information extraction model that is not adapted to take geographic indications into consideration (i.e., an "unadapted IE model"). In some embodiments, the geographic context of a document may conceivably be detected before using the unadapted IE model. In some embodiments, the geographic context can be detected using a pre-trained classifier that can be trained using documents that are clustered (i.e., grouped) by location names (e.g. countries). In other words, each cluster of training documents can be labeled with a location (i.e., class) name. Such clusters can be formed by exploiting semantic relatedness of documents with respect to geographic locations. If such a pre-trained classifier exists, the output (i.e., the prediction of the geographic context) of the classifier for an unseen (i.e., not part of the training documents) document can also be used as an indication apart from the geographic indications extracted from the relations/entities extracted by the unadapted IE model. Subsequently, all of these indications can be used to determine the geographic context of the text and can be fed back into the IE model to adapt the model accordingly.

Embodiments of the present disclosure may use the relevant location model to determine the most relevant country or countries, and switch or adapt an information extraction model depending on the region. For example, to detect mentions of phone numbers without a country code present, common scripts for parsing, formatting, and validating international phone numbers (e.g., libphonenumber) generally require a region to be known and specified.

Figure 4:
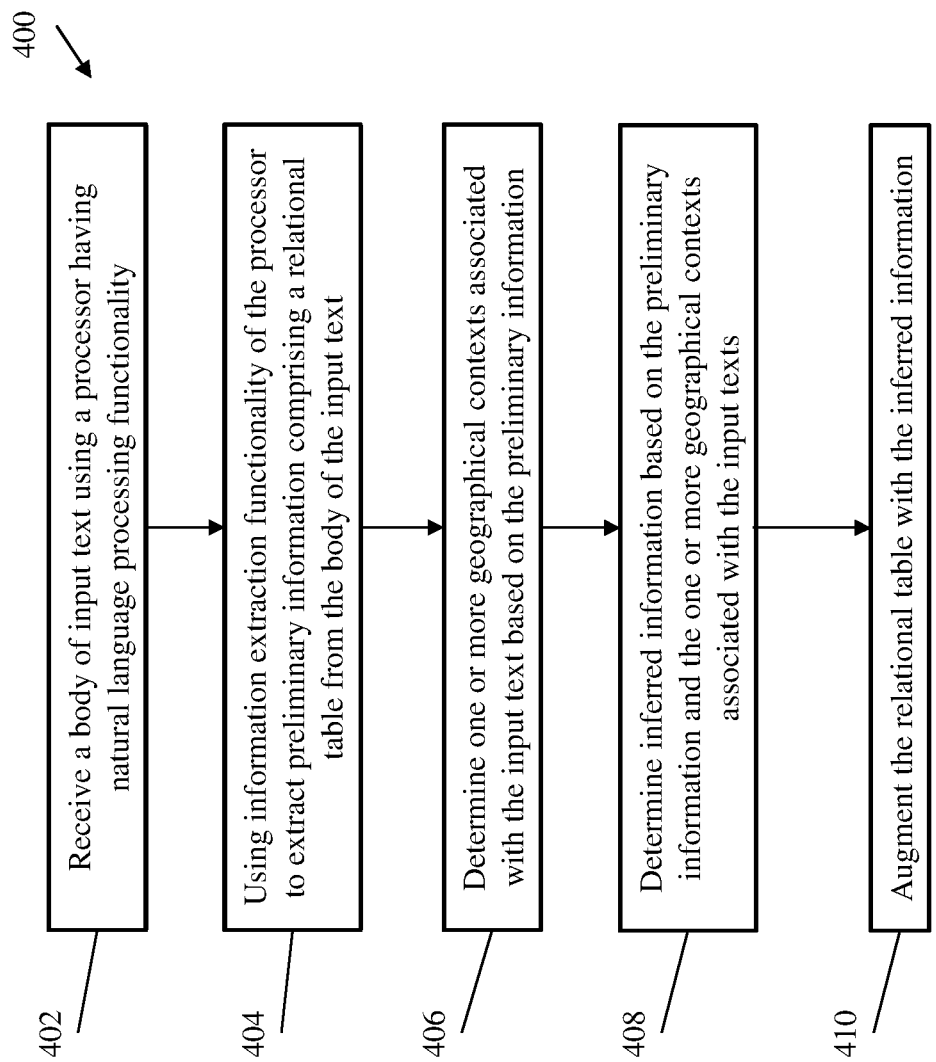
FIG. 4 depicts a flow diagram of a method for providing geographic location specific models for information extraction and knowledge discovery according to one or more embodiments of the invention.

Turning now to FIG. 4, a flow diagram of a method 400 for providing geographic location specific models for information extraction and knowledge discovery in accordance with an embodiment is shown. In one or more embodiments of the present invention, the method 400 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 400 begins at block 402 and includes receiving a body of input text. The body of input text can be received by a processor having natural language processing functionality. According to some embodiments, the body of input text can be a plurality of documents. According to some embodiments, the system (e.g., computing system 300) may be configured to receive a large number of documents or sources of unstructured text (e.g., by collecting documents/text using a web crawler). In some embodiments, the body of input text can include metadata such as metadata tags associated with a document or website that are indicative of a place, location and/or an address. According to some embodiments, metadata may be used in determining one or more geographical contexts of the body of input text as a whole or one or more arguments or relations of a relational table generated in response to performing information extraction as described herein. According to some embodiments, a geographical context may be determined based on metadata by, for example identifying a geographic context associated with a place, location or address included in the metadata.

At block 404, the method includes using information extraction functionality of the processor to extract preliminary information from the body of input text. The preliminary information can be extracted from the input text using known information extraction techniques as described previously above. In some embodiments, the preliminary information can be extracted as structured data, such as data in a relational table or a graph (i.e., a hyper-graph). For example, FIG. 5A shows example input text 502 that can be processed by an information extraction (IE) system 504 (e.g., implemented by processing system 300) to extract preliminary information in a relational table 506. As will appreciated by those of skill in the art, information extraction techniques can be applied to the input text 502 to generate a relational table 506 that includes a first column corresponding to a first argument (or entity), a second column corresponding to a second argument (or entity), and a third column corresponding to the relationship between the first and second arguments/entities. For example, as shown in FIG. 5A, the information extraction system 504 has processed the input text 502 to determine that "Festival of Pumpkins" has a "Location" relationship with "Paris". Each argument pair and corresponding relationship can be stored in a respective row of the relational table 506. Although this disclosure generally present embodiments in which information extracted by the system (i.e., preliminary information and inferred/augmented information) are represented in a relational table (e.g., relational table 506), it should be understood that the extracted information are semantic triples that can be stored in any suitable structured format, such as relational tables (i.e., databases), knowledge bases, ontology, and the like.

Figure 5B:
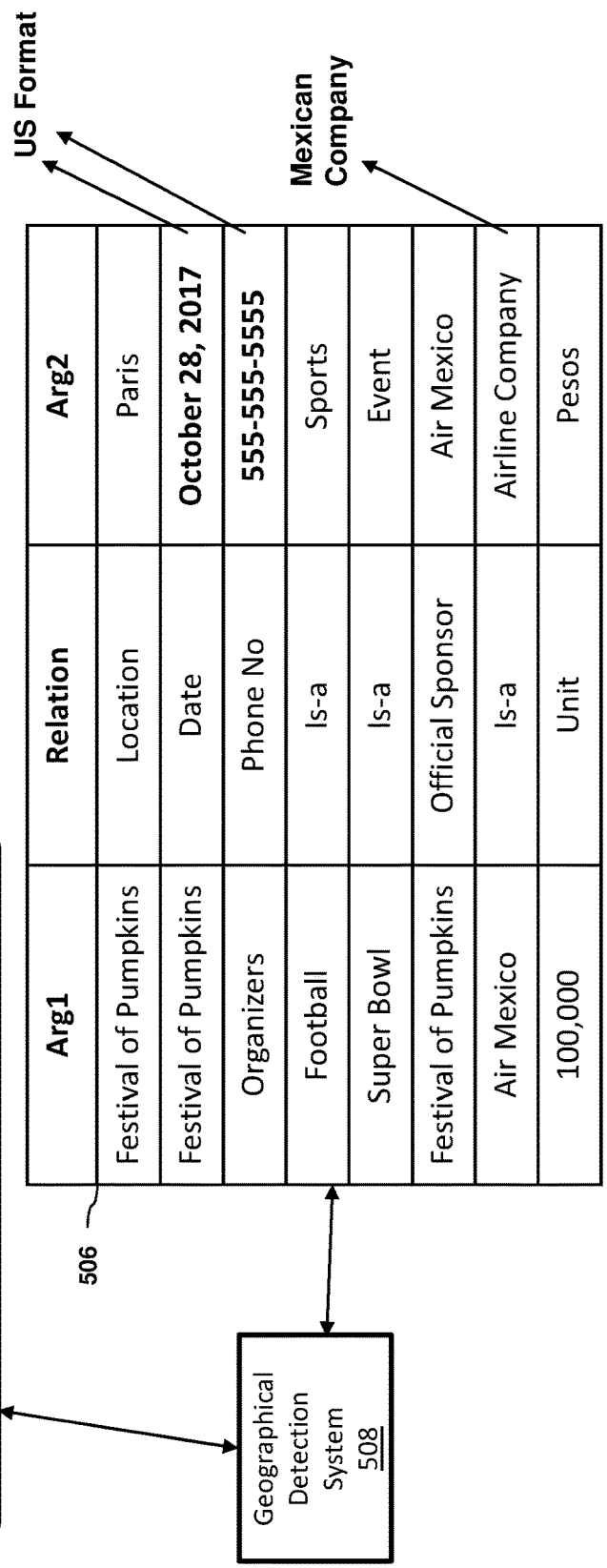
FIG. 5B depicts an example of geographically-based information extraction and knowledge discovery implemented according to one or more embodiments of the present invention.

At block 406, the method includes determining one or more geographical contexts associated with the input text based on the preliminary information, which may generally be unknown at the time of extraction of the preliminary information. For example, as shown in FIG. 5B, a geographical detection system 508 (e.g., implemented by processing system 300) can be configured to analyze the preliminary information in relational table 506 to identify geographic features of portions of the data and/or an entire text or document. Geographical detection system 508 can be configured to apply various algorithms or other functions to the preliminary data to identify geographical features (e.g., detection of geographically-based phone number, address and date formats), using, for example, semantic web resources, big data from the internet, bag of words in linear models (n-grams), machine learning models or topic models. For example, as shown in FIG. 5B, geographical detection system 508 may determine that although the geographical context of the input text is currently unknown, the date "Oct. 28, 2017" and the phone number "555-555-5555" are both in a U.S. format by for example, applying an algorithm configured to identify a country associated with a format of a date, telephone number, and/or an address. The geographical detection system 508 may also determine that the geographical context for "Air Mexico" is Mexico, by for example, applying an algorithm that matches known airline company names with associated countries.

Figure 5C:
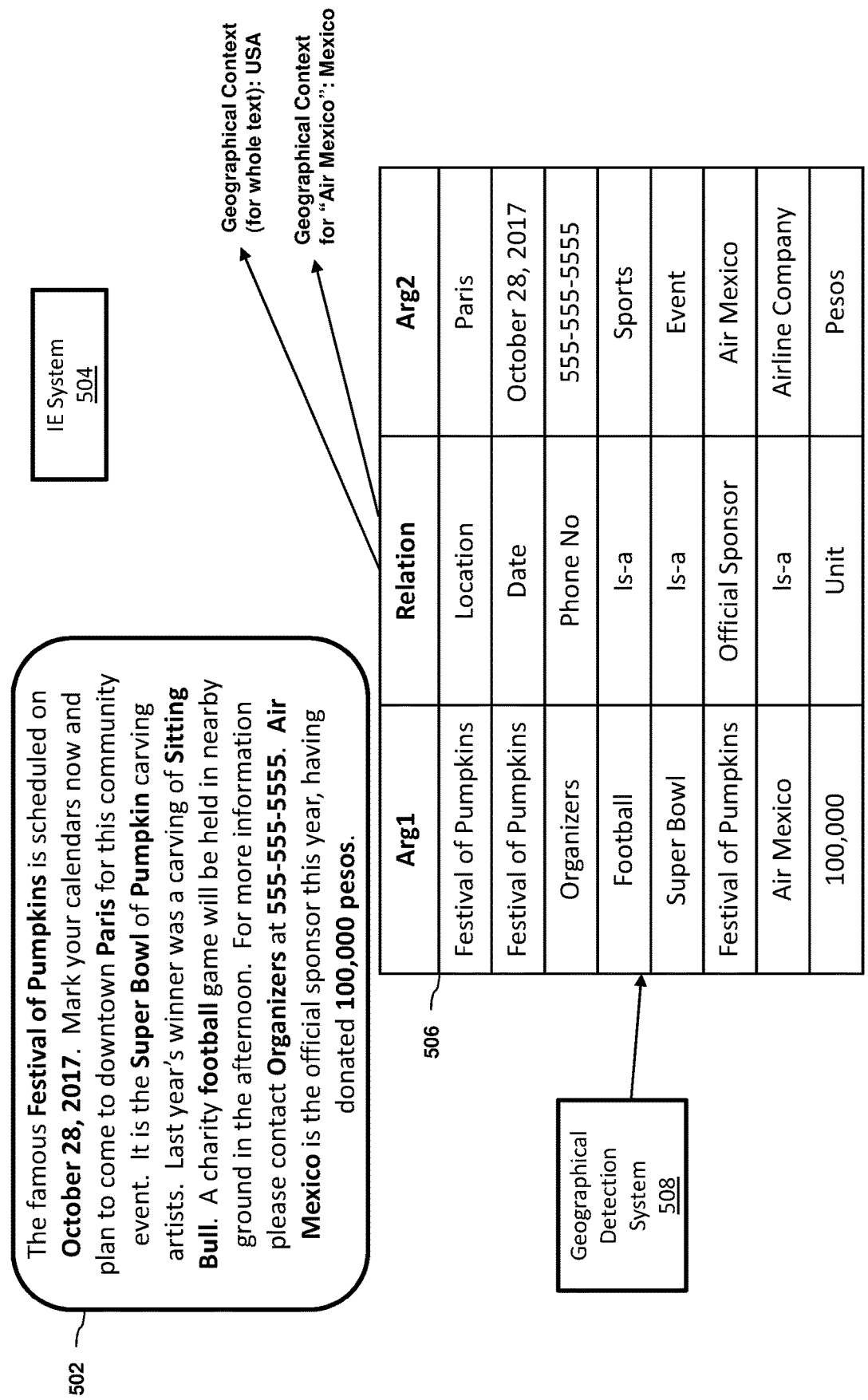
FIG. 5C depicts an example of geographically-based information extraction and knowledge discovery implemented according to one or more embodiments of the present invention.

As shown in FIG. 5C, the geographical detection system 508 can be configured to determine a geographical context for the entire text (i.e., input text 502) based on the determined geographical contexts that are associated with the text. For example, as shown in FIG. 5C, the geographical detection system 508 has determined that the geographical context of the whole text is USA. In some embodiments, the geographical detection system 508 can determine the geographical context for the whole text by, for example, determining the geographical contexts of a plurality of arguments/entities and identifying the geographical context that occurs the most frequently, which may be considered to be a semantic web resources approach. Other approaches for determining the geographical context for the whole text may include using one or more of big data from the internet, bag of words in linear models (n-grams), machine learning models or topic models. Thus, in the example shown in FIG. 5C, because two arguments have a geographical context of USA and only one has a geographical context of Mexico, the system may determine that the context of the entire text is USA. In some embodiments, the geographical detection system 508 may identify a plurality of different countries or geographies that the entire text may be associated with, and may determine a confidence score for each country representing the likelihood that a given country is the proper geographic context for the entire text. According to some embodiments, the confidence score may not be the geographical context that is mentioned the most in the data, but rather may be determined using a machine learning process that creates a confidence score based on, for example, considering IP addresses, website names and other such data relating to the source of the text. Further, in some embodiments, ensembling the semantic web resource based approach and the bag of words approach may not always predict the location mentioned most frequently. The geographical detection system 508 may then select the country/geography with the highest confidence as the geographical context to be associated with the entire document. In some embodiments, the geographical text of the entire text may instead be determined prior to the generation of the preliminary information by using a pre-trained classifier that can be trained using documents that are clustered by location names, as previously described above.

Figure 5D:
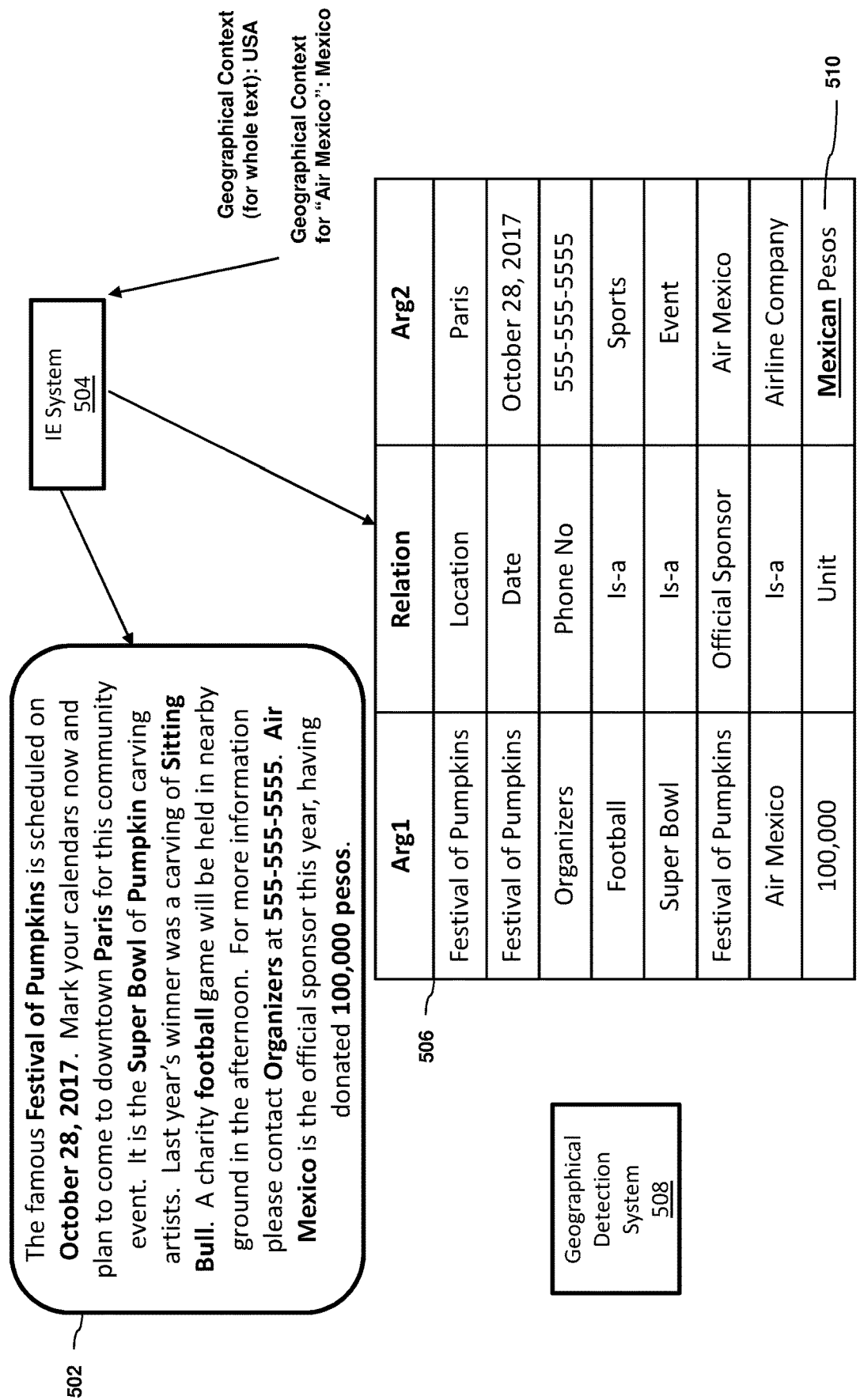
FIG. 5D depicts an example of geographically-based information extraction and knowledge discovery implemented according to one or more embodiments of the present invention.

At block 408, the method includes determining inferred information based on the preliminary information and the one or more geographical contexts associated with the input text. According to some embodiments, inferred information can be information that is discovered based on the geographical contexts of the relational table 506. For example, as shown in FIG. 5D, based on the determination that "Air Mexico" has a geographical context of Mexico, the information extraction system 504 may determine that "100,000

Pesos" refers to "Mexican Pesos" 510 (e.g., as opposed to, for example, Argentine pesos) and may update the relational table 506 accordingly.

As shown in FIG. 5E, based on the determination that the geographical context of the entire document was determined to be USA, the information extraction system 504 may determine that a city name (e.g., "Paris") is referring to a city in the USA. Thus, in the example shown in FIG. 5E, the system may infer that Paris is in the U.S., and may modify the relational table 506 with the inferred country 512 to change "Paris" to "Paris, USA". Similarly, as shown in FIG. 5E, the information extraction system 504 may determine that "Football" is referring to a type of sport associated with a nationality 514 (i.e., "American Sports") and that the "Super Bowl" is referring to a particular type 516 of event (i.e., "Sports Event"). Further, based on the geographical context of the whole text being determined to be USA, the information extraction system 504 may determine and add additional relationships to the relational table 506. For example, as shown in FIG. 5E, the information extraction system 504 may determine that "Sitting Bull" has an "Is-a" relationship with "Person" and may add this relationship in a new row 520. In other words, based on the geographical context of USA, the information extraction system 504 may determine that the phrase "Sitting Bull" refers to the well-known Native American leader (e.g., as opposed to referring to an animal), by for example, applying an algorithm that matches names of people associated with the geographic context of the USA against the text of the document. In this way, the disclosed system can leverage determined geographical contexts for knowledge discovery in an information extraction system and transform the original data extracted from the input text 502 into a more complete set of arguments and relations.

According to some embodiments, based on the detected geographical context(s), the information extraction system 504 can be configured to iteratively extract and discover new information, for example based on the previously discovered new information that was added to the relational table. In some embodiments, the information extraction system 504 can be configured to extract/discover new information by using a rule-based approach that applies different rule subsets depending on the location of the geographical context(s). For example, a rule may perform a pattern-matching function to attempt to match a telephone number format to one of a plurality of known telephone number formats associated with different countries/regions. Another rule may perform date recognition to distinguish between countries that use a day/month/year format as opposed to a month/day/year format. Another rule may match measurement metrics to one or more associated regions or countries (e.g., use of "miles" vs. "kilometers"). According to some embodiments, the information extraction system 504 may be configured to use a machine learning-based approach to extract/discovery new information. For example, the location (or probability distribution over locations) can be used as a feature in the information extraction system. Machine learning approaches can be effective for, for example, making determinations about the meanings of acronyms given a known geographical context (e.g., given that the geographical context is U.S., determining that "FDA" means "U.S. Food and Drug Administration"). Alternatively, for deep learning-based systems, the location (or probability distribution over locations) can be used as an index into a learned location embedding.

Next, as shown at block 410, the method includes augmenting and/or modifying the relational table with the inferred information. In some embodiments, one or more cells of the relational tables can be modified based on the inferred information. In some embodiments, the one or more new rows of data can be added to the relational table based on the inferred information. For example, as shown in FIGS. 5D-E, the information extraction system 504 added new row 520 and modified the cell storing "Paris" to include "USA", the cell storing "Sports" to include "American", the cell storing "Events" to include "Sports" and the cell including "Pesos" to include "Mexican", as described above. According to some embodiments, the augmented relational table may be used for various applications, such as for example, identifying an event. For instance, in some embodiments, an augmented relational table could be used to identify an event such as an FDA approval and the date the approval occurred. The disclosed techniques may be useful in determining information or events in for example, the medical domain, the financial domain, or any other area where enhancements to information extraction data based on geographical contexts may be useful.

Figure 5F:
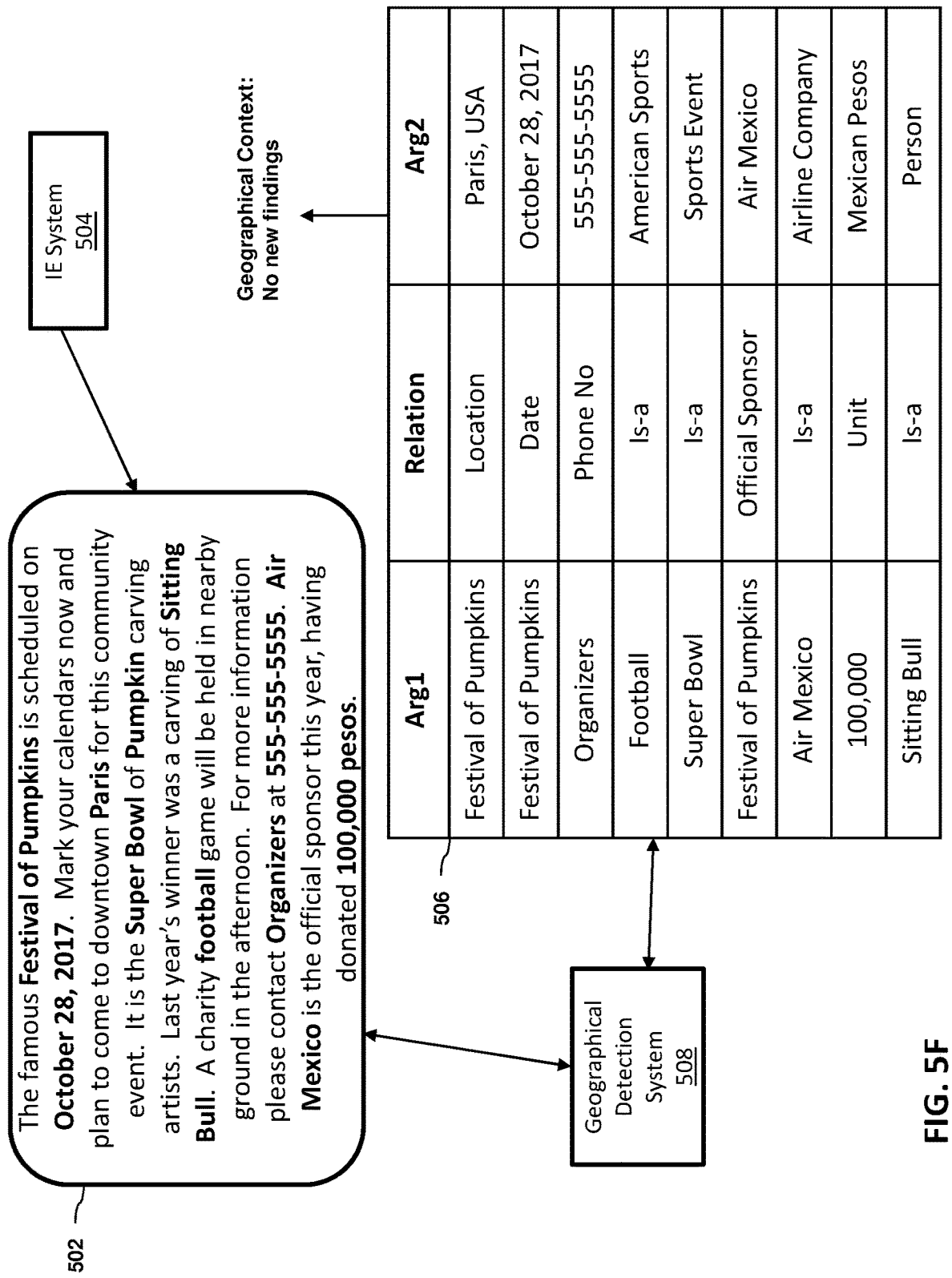
FIG. 5F depicts an example of geographically-based information extraction and knowledge discovery implemented according to one or more embodiments of the present invention.

As described above, in some embodiments, inferred information can be iteratively determined by the information extraction system 504 based on iterative discovery of new geographical contexts. Thus, according to some embodiments, determining inferred information can include determining first inferred information based on the preliminary information and the one or more geographical contexts associated with the input text, determining one or more new geographical contexts associated with the input text and the first inferred information based on the preliminary information, the one or more geographical contexts associated with the input text and the first inferred information, and determining second inferred information based on the preliminary information, the one or more geographical contexts associated with the input text, the first inferred information and the one or more new geographical contexts associated with the input text and the first inferred information. According to some embodiments, the iterative determination of inferred information can be ceased in response to determining that no new geographical contexts remain to be discovered. For example, as shown in FIG. 5F, the geographical detection system 508 analyzes the augmented relational table 506 and determines that there are no new geographical contexts and therefore the system may cease performing iterative discovery and updates and output the resulting relational table 506 as an output. As described previously above, the final output may be a table of extracted data that has been improved through awareness of the locations relevant to the document or text, which may then be used to provide better insights into the relationships and meanings behind the data. According to some embodiments, the output table of extracted data may be used for, for example, generating responses to queries and/or tasks such as knowledge base population (KBP) (i.e., taking an incomplete knowledge base and a large corpus of text to complete the incomplete elements of the knowledge base using techniques such as slotfilling and entity linking).

According to some embodiments, the method 500 may further include, responsive to receiving a query associated with the relational table, generating a geographically-contextual query response comprising information that is based on the inferred information. In some embodiments, a geographically-contextual query response may be a response that provides geographically-contextual information about one or more of a locality in relation to a phone number format, an address format and/or a date format, a nationality associated with a currency and/or compliance issues. Compliance issues may relate to the adherence to various legal or cultural rules, such as for example, the use of "Halal" or "Kosher" foods, a prohibition on certain activities in particular countries, or how much hard cash one can carry when traveling to certain countries.

Additional processes may also be included. It should be understood that the processes depicted in FIGS. 4 and 5A-F represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, using a processor having natural language processing functionality, a body of input text;
using information extraction functionality of the processor to extract preliminary information comprising a relational table from the body of input text;
determining, based on the preliminary information, one or more geographical contexts associated with the input text;
determining, based on the preliminary information and the one or more geographical contexts associated with the input text, inferred information; and
augmenting the relational table with the inferred information;
responsive to receiving a query associated with the relational table, generating a geographically-contextual query response comprising information that is based on the inferred information, wherein the geographically-contextual query response comprises a response providing geographically-contextual information about one or more of:
a locality in relation to a phone number format, an address format or a date format;
a nationality associated with a currency; and
compliance issues.

2. The computer-implemented method of claim 1, wherein the body of input text comprises a plurality of documents.

3. The computer-implemented method of claim 2, wherein:
the plurality of documents comprises metadata; and
determining one or more geographical contexts associated with the input text is further based on the metadata.

4. The computer-implemented method of claim 1, wherein determining inferred information comprises:
determining, based on the preliminary information and the one or more geographical contexts associated with the input text, first inferred information;
determining, based on the preliminary information, the one or more geographical contexts associated with the input text and the first inferred information, one or more new geographical contexts associated with the input text and the first inferred information; and
determining second inferred information based on the preliminary information, the one or more geographical contexts associated with the input text, the first inferred information and the one or more new geographical contexts associated with the input text and the first inferred information.

5. The computer-implemented method of claim 4, wherein inferred information is iteratively determined based on iterative discovery of new geographical contexts.

6. The computer-implemented method of claim 5, wherein iterative determination of inferred information ceases in response to determining that no new geographical contexts remain to be discovered.

7. A system comprising:
a processor communicatively coupled to a memory, the processor having natural language processing functionality and being configured to:
receive a body of input text;
use information extraction functionality of the processor to extract preliminary information comprising a relational table from the body of input text;
determine, based on the preliminary information, one or more geographical contexts associated with the input text;
determine, based on the preliminary information and the one or more geographical contexts associated with the input text, inferred information; and
augment the relational table with the inferred information;
responsive to receiving a query associated with the relational table, generate a geographically-contextual query response comprising information that is based on the inferred information, wherein the geographically-contextual query response comprises a response providing geographically-contextual information about one or more of:
a locality in relation to a phone number format, an address format or a date format;
a nationality associated with a currency; and
compliance issues.

8. The system of claim 7, wherein the body of input text comprises a plurality of documents.

9. The system of claim 8, wherein:
the plurality of documents comprises metadata; and
determining one or more geographical contexts associated with the input text is further based on the metadata.

10. The system of claim 7, wherein determining inferred information comprises:
determining, based on the preliminary information and the one or more geographical contexts associated with the input text, first inferred information;
determining, based on the preliminary information, the one or more geographical contexts associated with the input text and the first inferred information, one or more new geographical contexts associated with the input text and the first inferred information; and
determining second inferred information based on the preliminary information, the one or more geographical contexts associated with the input text, the first inferred information and the one or more new geographical contexts associated with the input text and the first inferred information.

11. The system of claim 10, wherein inferred information is iteratively determined based on iterative discovery of new geographical contexts.

12. The system of claim 11, wherein iterative determination of inferred information ceases in response to determining that no new geographical contexts remain to be discovered.

13. A computer program product comprising a computer readable storage medium having program instructions embodied therewith the program instructions executable by a computer processor to cause the computer processor to perform a method comprising:

receiving, using a processor having natural language processing functionality, a body of input text;

using information extraction functionality of the processor to extract preliminary information comprising a relational table from the body of input text;

determining, based on the preliminary information, one or more geographical contexts associated with the input text;

determining, based on the preliminary information and the one or more geographical contexts associated with the input text, inferred information; and augmenting the relational table with the inferred information;

responsive to receiving a query associated with the relational table, generating a geographically-contextual query response comprising information that is based on the inferred information, wherein the geographically-contextual query response comprises a response providing geographically-contextual information about one or more of:

a locality in relation to a phone number format, an address format or a date format;

a nationality associated with a currency; and compliance issues.

14. The computer program product of claim 13, wherein determining inferred information comprises:

determining, based on the preliminary information and the one or more geographical contexts associated with the input text, first inferred information;

determining, based on the preliminary information, the one or more geographical contexts associated with the input text and the first inferred information, one or more new geographical contexts associated with the input text and the first inferred information; and determining second inferred information based on the preliminary information, the one or more geographical contexts associated with the input text, the first inferred information and the one or more new geographical contexts associated with the input text and the first inferred information.

15. The computer program product of claim 14, wherein inferred information is iteratively determined based on iterative discovery of new geographical contexts.

16. The computer program product of claim 15, wherein iterative determination of inferred information ceases in response to determining that no new geographical contexts remain to be discovered.

* * * * *